US012257658B2

(12) United States Patent
Goehring et al.

(10) Patent No.: US 12,257,658 B2
(45) Date of Patent: Mar. 25, 2025

(54) DUST SUCTION DEVICE

(71) Applicant: Robert Bosch GmbH, Stuttgart (DE)

(72) Inventors: Daniel Goehring, Kreuzlingen (DE); Juergen Dietel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1007 days.

(21) Appl. No.: 17/268,566

(22) PCT Filed: Aug. 13, 2019

(86) PCT No.: PCT/EP2019/071681
§ 371 (c)(1),
(2) Date: Feb. 15, 2021

(87) PCT Pub. No.: WO2020/043478
PCT Pub. Date: Mar. 5, 2020

(65) Prior Publication Data
US 2021/0252655 A1 Aug. 19, 2021

(30) Foreign Application Priority Data
Aug. 29, 2018 (DE) ...................... 10 2018 214 614.4

(51) Int. Cl.
*B23Q 11/00* (2006.01)
*A47L 7/00* (2006.01)
*B25F 5/00* (2006.01)
(52) U.S. Cl.
CPC ........ *B23Q 11/0046* (2013.01); *A47L 7/0095* (2013.01); *B23Q 11/0071* (2013.01); *B25F 5/00* (2013.01)

(58) Field of Classification Search
CPC ............ B23B 2270/30; B23B 2270/62; B23Q 11/0071; B23Q 11/0046; A47L 7/0095
See application file for complete search history.

(56) References Cited

U.S. PATENT DOCUMENTS 8,915,309 B2 * 12/2014 Kakiuchi ........... B23Q 11/0046
173/171
9,304,223 B2 * 4/2016 DeMaira .................. G01V 3/08
(Continued)

FOREIGN PATENT DOCUMENTS

CN 101124428 A 2/2008
CN 101607424 A 12/2009
(Continued)

OTHER PUBLICATIONS

Cridland, Translation of Dust Collecting Attachment for Power Drills, Mar. 18, 1992, pp. 5.*
(Continued)

*Primary Examiner* — Alan Snyder
*Assistant Examiner* — Reinaldo A Del Vargas Rio
(74) *Attorney, Agent, or Firm* — Maginot, Moore & Beck LLP

(57) ABSTRACT

The disclosure relates to a dust suction device for a hand-held power tool, comprising a housing, a fan unit accommodated in the housing for generating an air volume flow, at least one suction opening for suctioning off drill cuttings from a borehole, and at least one suction intake opening for generating a negative pressure in an adhesion region between the dust suction device and a workpiece on the basis of the air volume flow.

10 Claims, 8 Drawing Sheets

(56) References Cited

U.S. PATENT DOCUMENTS

Figure 1:
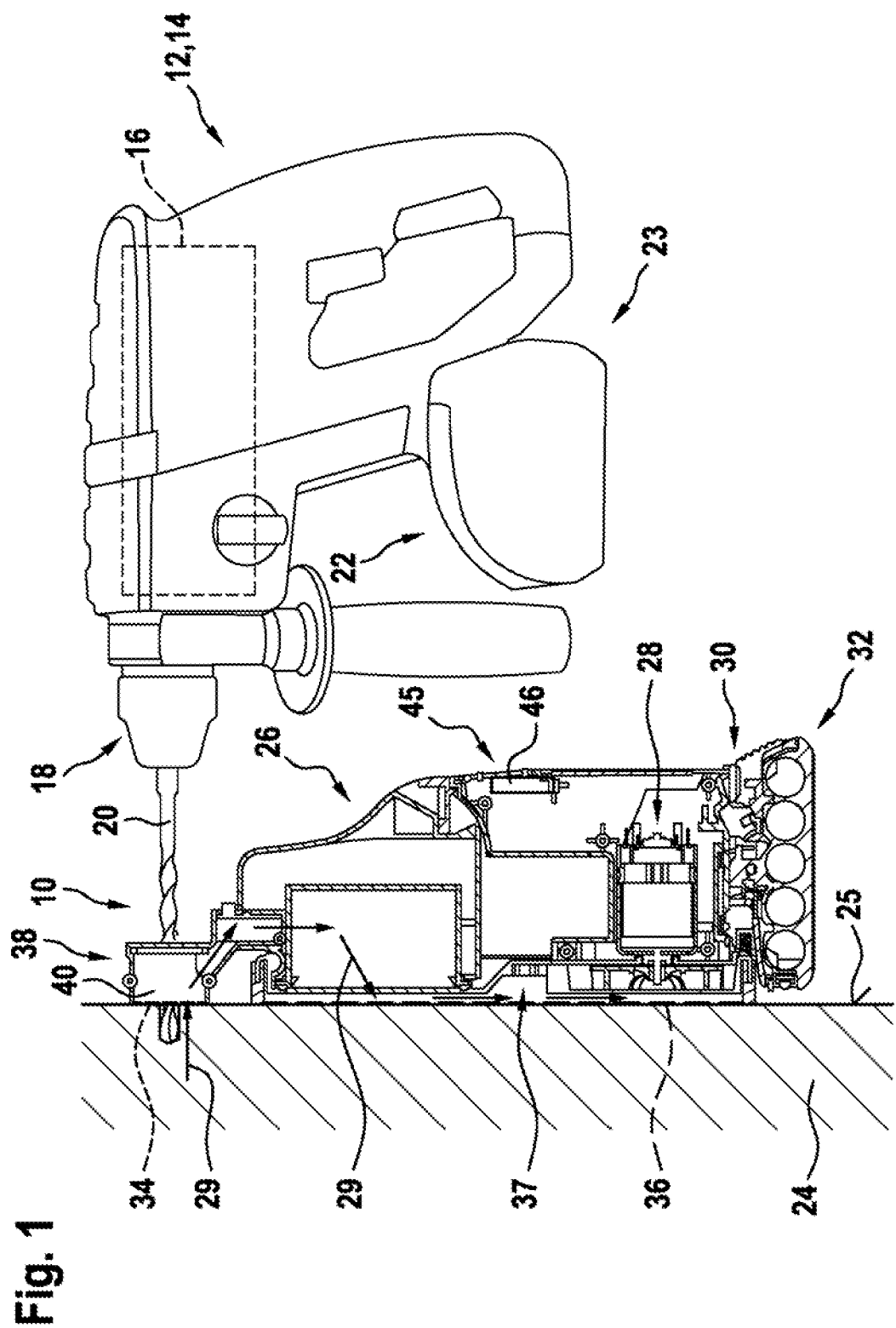

| | | | |
|---|---|---|---|
| 10,702,981 B2 * | 7/2020 | Ullrich | .......... B25D 17/20 |
| 2009/0317200 A1 | 12/2009 | Bruntner | |
| 2010/0045215 A1 | 2/2010 | Hawker et al. | |
| 2013/0213683 A1 | 8/2013 | Brewster et al. | |
| 2014/0184192 A1 | 7/2014 | DeMaira et al. | |
| 2021/0170501 A1 * | 6/2021 | Barezzani | .......... E01B 31/24 |

FOREIGN PATENT DOCUMENTS

| | | |
|---|---|---|
| DE | 35 01 753 A1 | 7/1986 |
| DE | 101 15 116 A1 | 10/2002 |
| DE | 10 2009 000 084 A1 | 7/2010 |
| DE | 10 2011 079 294 A1 | 1/2013 |
| DE | 10 2013 102 726 A1 | 10/2013 |
| DE | 10 2013 215 788 A1 | 2/2015 |
| DE | 10 2015 226 021 A1 | 6/2017 |
| EP | 1 245 330 A2 | 10/2002 |
| EP | 2 312 194 A1 | 4/2011 |
| EP | 2 639 010 A1 | 9/2013 |
| EP | 2 656 968 A2 | 10/2013 |
| GB | 2247852 A * | 3/1992 ......... B23Q 11/0046 |
| WO | WO-2017076457 A1 * | 5/2017 |

OTHER PUBLICATIONS

Translation of WO 2017076457, De Marco M, Suction Head, May 11, 2017, pp. 8 (Year: 2017).*
International Search Report corresponding to PCT Application No. PCT/EP2019/071681, mailed Oct. 30, 2019 (German and English language document) (7 pages).

* cited by examiner

DUST SUCTION DEVICE

This application is a 35 U.S.C. § 371 National Stage Application of PCT/EP2019/071681, filed on Aug. 13, 2019, which claims the benefit of priority to Serial No. DE 10 2018 214 614.4, filed on Aug. 29, 2018 in Germany, the disclosures of which are incorporated herein by reference in their entirety.

BACKGROUND

DE 10 2013 102 726 A1 describes a vacuum cleaner that has a suction attachment, the suction attachment having a suction port that has a through-opening for a drill bit, and has an aspiration region, separate from the suction port, for attachment to a wall surface by suction. The suction port can be uncoupled from a negative pressure generated by the vacuum cleaner.

SUMMARY

The disclosure relates to a dust extraction device for a hand-held power tool, having a housing, a fan unit, accommodated in the housing, for generating an air volume flow, at least one extraction opening for extracting drilling debris by suction from a drill hole, and at least one aspiration opening for generating a negative pressure, in an adhesion region between the dust extraction device and a workpiece, by means of the air volume flow. It is thereby possible, advantageously, to realize an efficient dust extraction device with particularly convenient handling.

The dust extraction device is realized, in particular, as a self-holding, or self-aspirating, dust extraction device. A self-holding dust extraction device in this context is to be understood to mean a dust extraction device that can be fully attached to the workpiece during operation, or as work is being performed. In particular, the dust extraction device is realized in such a manner that, during operation, the fan unit accommodated in the housing can be attached to the workpiece. In particular, a connection to an external vacuum cleaner, for example via a suction hose, is not required for operation of the dust extraction device, or for attaching the dust extraction device.

A hand-held power tool is to be understood to mean, in particular, a power tool that is held in the hand during operation. The hand-held power tool may be realized, for example, as a mains-operated appliance. It is also conceivable, however, for the hand-held power tool to be realized as a battery-operated hand-held power tool, the hand-held power tool preferably having a battery interface via which it is separably connected to a hand-held power tool battery pack. In the context of this application, a separable connection is to be understood to mean, in particular, a connection that can be undone without the use of any tool. The hand-held power tool battery pack is preferably exchangeable. The hand-held power tool is designed, in particular, to produce a drill hole in a workpiece. The hand-held power tool may be realized, for example, as a power drill, as a drill/screwdriver, as a rotary percussive drill, as a hammer drill, or the like. The workpiece may be, for example, a wooden or concrete wall. As the drill hole is being made by the hand-held power tool, drilling debris is produced, at least some of which comes out of the drill hole.

The fan unit comprises at least one drive unit for driving at least one fan element. The fan unit may be designed to generate a single air volume flow or a plurality of air volume flows. The drive unit is realized, in particular, as an electric motor. The fan element is realized, in particular, as a ventilating fan, preferably as a radial ventilator. Alternatively, other ventilating fans known to persons skilled in the art are also conceivable, such as, for example, an axial ventilator, a diagonal ventilator or a tangential ventilator. The fan element is coupled, in particular rotationally, to the drive unit. The fan unit is accommodated, in particular completely, in the housing of the dust extraction device, or is integrated in the housing of the dust extraction device. The dust extraction device has an air channel that, when attached to the workpiece, extends from the extraction opening to the fan unit. The air channel is substantially closed, and when the dust extraction device is in operation there is a negative pressure within the air channel. In the unattached state, the air channel is in particular shortened, such that the air channel extends from the aspiration opening to the fan unit. When the dust extraction device is in operation, the air volume flow generated by the fan unit moves from the extraction opening, or the aspiration opening, in the direction of the fan unit.

The extraction opening and the aspiration opening are realized as mutually separate openings of the housing of the dust extraction device. The aspiration opening and the extraction opening are arranged, in particular, on the same side, preferably on a side of the dust extraction device that, in the attached state, faces toward the workpiece.

In particular, in the region of the extraction opening the dust extraction device is realized in such a manner that, when the dust extraction device is in operation, air can be sucked in between a flat workpiece and the dust extraction device. This may be realized, for example, in that, when having been attached to the workpiece, the extraction opening is spaced apart from the workpiece, at least partially, in particular completely, by a gap. In a preferred embodiment, the extraction opening of the dust extraction device, when having been attached to the workpiece, bears against the workpiece via at least one stop element. During operation, drilling debris, or dust, is actively picked up by the dust extraction device, via the extraction opening, by means of an air flow, or is aspirated out of the drill hole and/or out of the surroundings of the drill hole.

Preferably, in the region of the aspiration opening the dust extraction is realized in such a manner that, when the dust extraction device is in operation, the ingress of air via the aspiration opening is minimized. This may be realized, for example, in that the aspiration opening is delimited by a circumferential sealing means, for example a flexible sealing lip, that bears against the workpiece during operation. The aspiration opening has a greater area than the extraction opening. Compared with the extraction opening, the aspiration opening has an area that, in particular, is at least five times greater, preferably at least ten times greater, more preferably at least twenty times greater.

The adhesion region is realized, in particular, as a space that is enclosed by the housing of the dust extraction device and that has at least three openings. One of the openings is realized as the aspiration opening. The other two openings are provided as part of the air channel for guiding the air volume flow into the adhesion region and out of the adhesion region.

It is furthermore proposed that the extraction opening be connected to the adhesion region in such a manner that there is a negative pressure present, both in the region of the extraction opening and in the adhesion region, while drilling debris is being extracted from the drill hole by suction, wherein the negative pressure in the region of the extraction opening differs from the negative pressure in the adhesion region. It is thereby possible, advantageously, to realize a sufficient magnitude of adhesive force of the dust extraction device on the workpiece. In particular, the dust extraction device is realized in such a manner that, during operation, there is always a greater negative pressure present in the adhesion region than in the region of the extraction opening.

It is furthermore proposed that the dust extraction device can be electrically connected to at least one battery cell. The at least one battery cell may be separably or inseparably connected to the housing. A battery cell that is inseparably connected to the housing is to be understood to mean, in particular, a battery cell that, when having been connected to the dust extraction device, can be charged, for example, via a charging device. The inseparably connected battery cell is preferably accommodated in the housing of the dust extraction device, or integrated in the housing of the dust extraction device. The at least one battery cell is designed, in particular, to supply energy for at least one function of the dust extraction device. For example, the battery cell may be designed to supply energy to the fan unit. Alternatively or additionally, the at least one battery cell may also be designed to supply energy to a set of electronics of the dust extraction device, to a task lighting system of the dust extraction device, or to a communication interface of the dust extraction device. The task lighting system may be, for example, one or more light-emitting diodes arranged on the side of the dust extraction device that faces toward the workpiece. A communication interface in this context is to be understood to mean, in particular, a means for wirelessly, or contactlessly, exchanging data, for example via Bluetooth, GSM, LTE, UMTS, RFID, etc. The communication interface is designed, in particular, for exchanging data with an external device, for example a smartphone, a computer, or a back-end such as a server, or a hand-held power tool. Preferably, the hand-held power tool and the dust extraction device are connected to each other in such a manner that activation of the hand-held power tool is possible only after activation of the dust extraction device.

It is additionally proposed that the dust extraction device have a battery interface, wherein the battery interface is designed for connecting the dust extraction device to a battery pack, in particular to a hand-held power tool battery pack. This advantageously enables the dust extraction device to be supplied with energy by means of exchangeable battery packs. The battery interface of the dust extraction device is, in particular, substantially identical in design to the battery interface of the hand-held power tool. The battery interface has a mechanical interface for mechanical coupling to the battery pack. The mechanical interface is designed, in particular, for force-fitting and/or form-fitting connection. The battery interface additionally has an electrical interface for electrical connection to the battery pack. The electrical interface preferably comprises at least two electrical contact elements for transmitting energy. Furthermore, the electrical interface may have one or more additional contacts, for example a coding contact, or an additional contact for transmitting temperature information of the battery pack and/or of the dust extraction device.

It is furthermore proposed that the dust extraction device have a dust collection chamber that has a filter element. The dust collection chamber may be connected, at least partially separably, to the dust extraction device. The dust collection chamber is arranged, in particular, in the housing of the dust extraction device. The dust extraction system may be fixedly integrated in the housing of the dust extraction device or separably connected to it. The dust collection chamber is preferably removable. For example, the dust collection chamber may be such that it can be connected to the housing of the dust suction device via a swivel mechanism or a linear guide.

The filter element is preferably realized as a HEPA filter. The filter element may be such that it can be separably or inseparably to the housing, in particular of the dust collection chamber, of the dust extraction device. In particular, the filter element delimits the dust collection chamber. The filter element is preferably arranged in a transition between the dust collection chamber and the adhesion region, with the result that only a substantially dust-free air flow enters the adhesion region. Advantageously, this measure ensures that no dust marks are created on the workpiece. It is furthermore proposed that a negative pressure in the dust collection chamber is less than in the adhesion region. In particular, in the direction of flow, the filter element is arranged in front of the adhesion region.

Preferably, there is a filter cleaning mechanism, by means of which the filter element can be cleaned, at least partially, integrated in the dust collection chamber. The filter cleaning mechanism may be, for example, a mechanical mechanism that causes the filter element to move. In particular, the mechanical mechanism is driven by means of a motor, preferably by means of the electric motor of the fan unit. Also conceivable, alternatively, is a filter cleaning mechanism in which the air volume flow is guided at least partially in an opposite direction, in such a manner that the filter element is blown-through.

It is additionally proposed that the extraction opening be assigned to a dust nozzle that can be separably connected to the housing of the dust extraction device. Advantageously, an exchangeable dust nozzle enables the dust extraction device, or the extraction opening, to be adapted to different insert tools such as, for example, drill bits having different diameters, or a core drill bit. The dust nozzle is realized, in particular, as a housing part. In particular, the dust nozzle is designed to be separably connectable to the dust collection chamber.

It is furthermore proposed that the dust nozzle be designed so as to be at least partially movable relative to the housing of the dust extraction device. This advantageously makes it possible to alter the region of extraction by suction without removing the dust extraction device from the workpiece. The dust nozzle may have one, two or more joints to allow it to be positioned as flexibly as possible. In particular, the dust nozzle is designed to be movable in such a manner that the extraction opening can assume different positions when held on the workpiece.

It is furthermore proposed that the dust extraction device have a control unit that controls the dust extraction device, by closed-loop or open-loop control, in dependence on a charge state of the at least one battery cell, or of the battery pack. In particular, the control unit is designed to prevent activation of the dust extraction device, or of the fan unit, if the charge state falls below a minimum value. The minimum value may be, for example, at most 40% of the maximum capacity, in particular at most 30% of the maximum capacity, preferably at most 20% of the maximum capacity, of the at least one battery cell, or of the battery pack. Furthermore, it is conceivable for the control unit to be connected to an optical or acoustic output unit, via which information relating to the charge state, in particular a low charge state, can be output as an indication, for example via a colored light, a flashing light, a warning tone, etc.

It is additionally conceivable for the dust extraction device to have a sensor unit designed to sense a characteristic value of the air flow. The sensor unit comprises at least one sensor element, for example a negative-pressure sensor. The sensor element may be arranged, for example, in the suction head, in the dust collection chamber or in the adhesion region. Preferably, the characteristic value of the air flow sensed by means of the sensor unit is provided to the control unit. Advantageously, a warning signal can thus be output if the aspiration force in the adhesion region falls below a threshold value.

Furthermore, it is conceivable for the dust extraction device, in particular the housing of the dust extraction device, to have a securing element, by means of which the dust extraction system can be secured against falling to the ground. For example, it is conceivable for the housing to be provided with a securing element, in the form of an eye or a hook, that can be connected to a securing cord.

It is additionally proposed that the housing have a handle that extends, in particular, substantially parallel to the aspiration opening. The handle makes it possible, advantageously, to achieve better handling of the dust extraction device. In particular, the battery interface is arranged in or on the handle. The battery interface may be arranged, for example, beneath the handle. Alternatively, it is also conceivable for the battery interface to be arranged in the handle in such a manner that the battery pack is at least partially, preferably mainly, accommodated in the handle.

It is furthermore proposed that the dust extraction device have a protective unit for protecting the fan unit. By means of the protective unit it can be ensured, advantageously, that no drilling debris can enter the fan unit via the aspiration opening. Preferably, the protective unit has at least one filter element. The filter element may be arranged in the adhesion region or adjacent to the adhesion region. The filter element may be realized, for example, as a HEPA filter, as a metal mesh, as a non-woven fabric, as a foam, or the like. In particular, the filter element of the protective unit has a larger pore size than the filter element of the dust collection chamber, since the fine drilling dust is already filtered via the filter element of the dust collection chamber. The protective unit may be separably or inseparably connected to the dust extraction device.

It is furthermore proposed that the housing have at least two separably connected housing parts, wherein the first housing part has at least the dust collection chamber and the fan unit, and the second housing part comprises at least the adhesion region. The housing parts are connected, in particular, in a force-fitting and/or form-fitting manner. It is furthermore proposed that the dust extraction device can be used, as a hand-held vacuum cleaner, without the second housing part. Thus, advantageously, an additional application option can be realized.

DRAWINGS

Further advantages are disclosed by the following description of the drawings. The drawings, the description and the disclosure contain numerous features in combination. Persons skilled in the art will expediently also consider the features individually and combine them to form appropriate further combinations. References of features of different embodiments of the disclosure that substantially correspond to each other are denoted by the same number and by a letter that denotes the embodiment.

Figure 2:
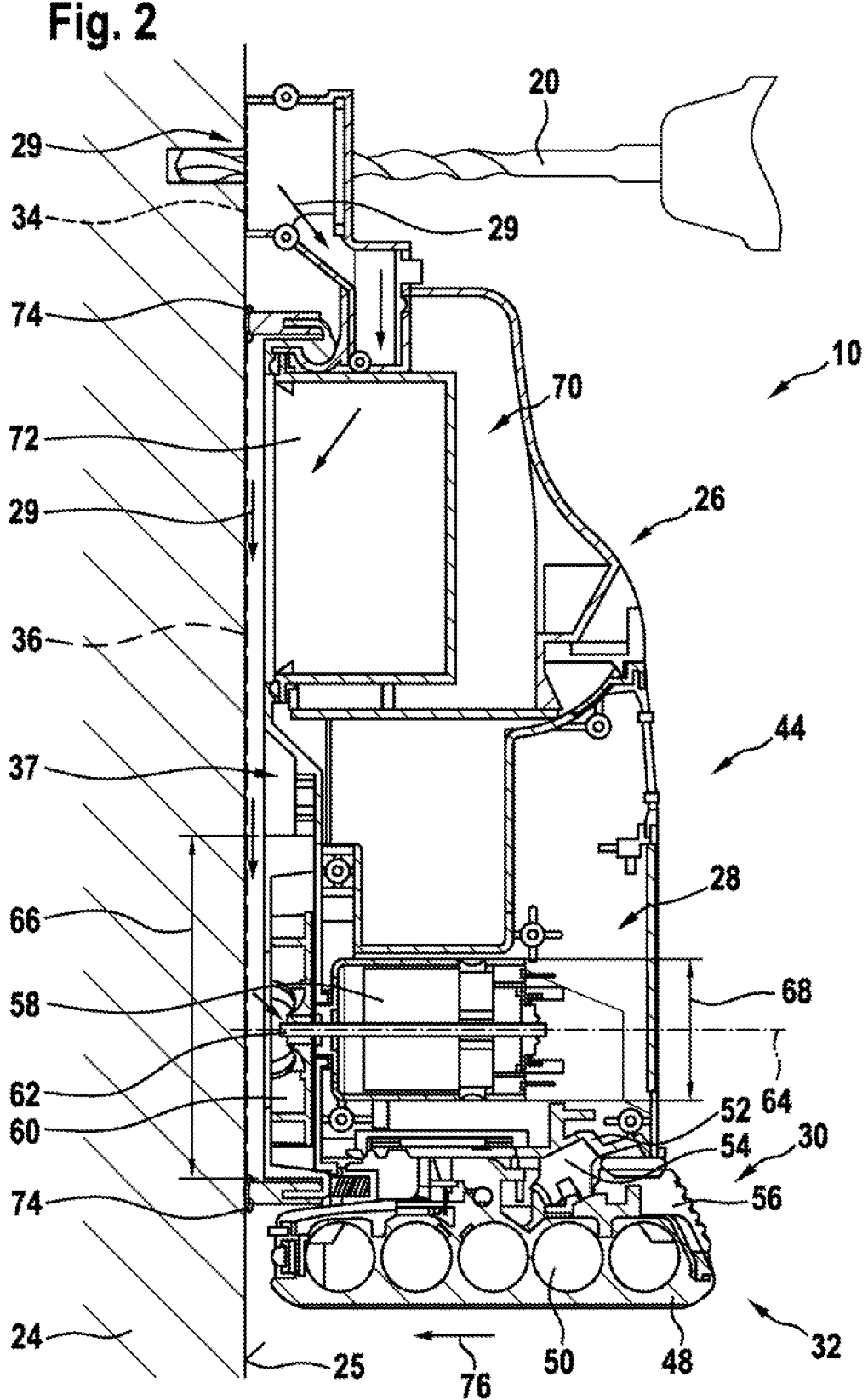
Figure 3A:
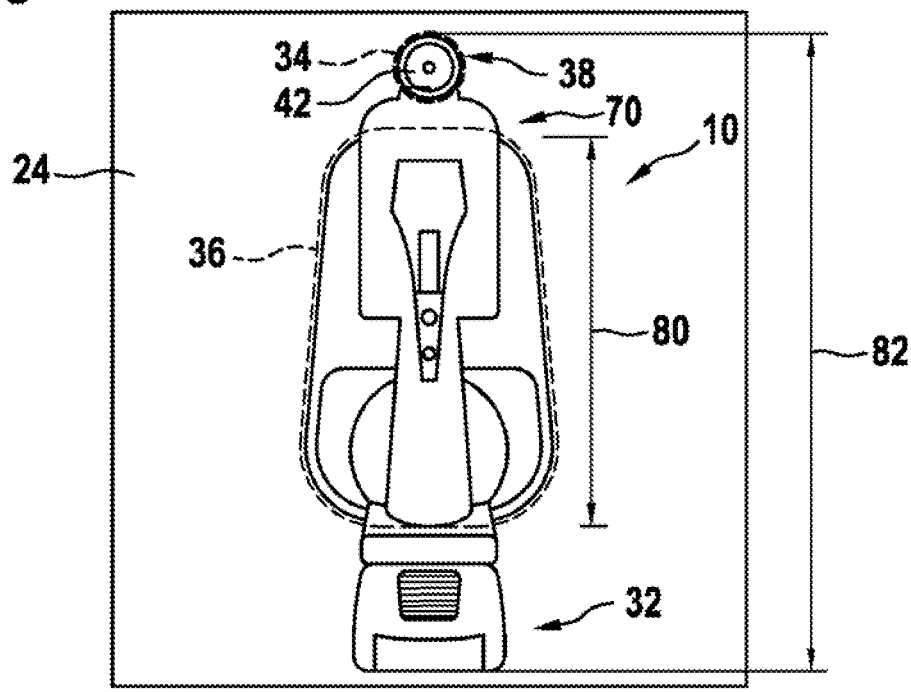
Figure 3B:
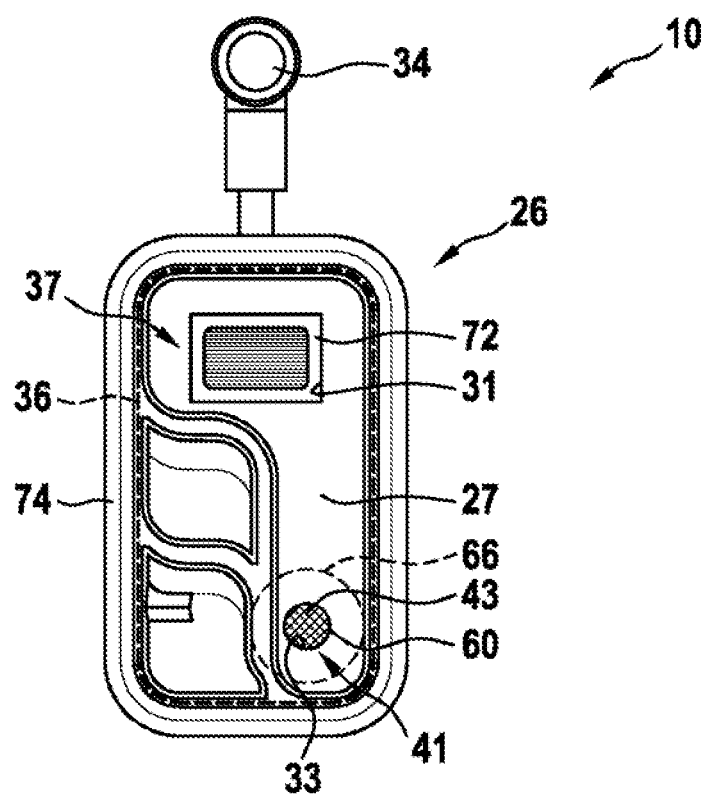
Figure 4A:
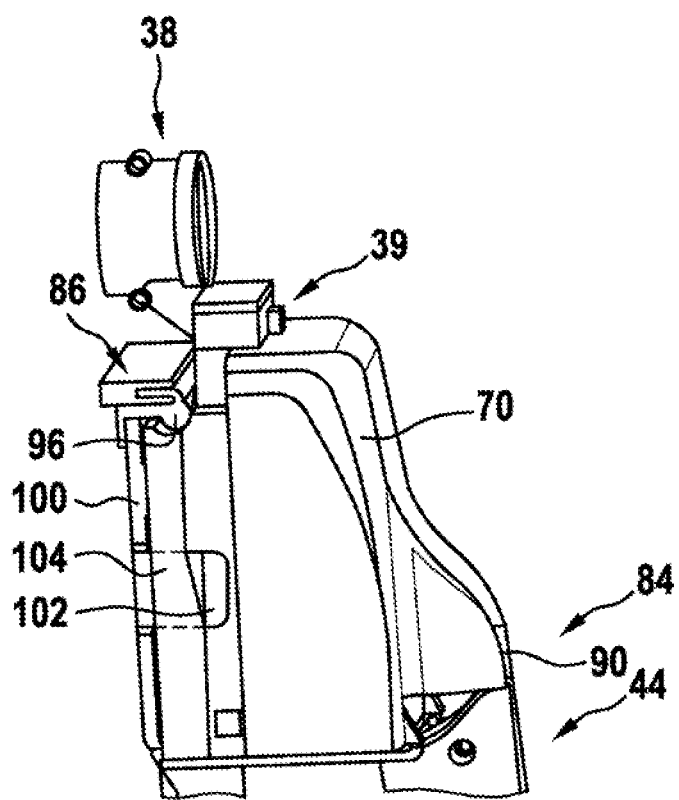
Figure 4B:
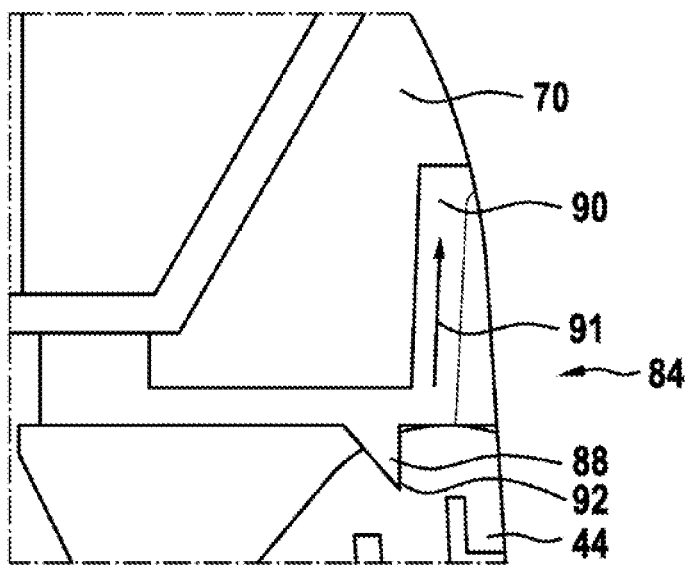
Figure 4C:
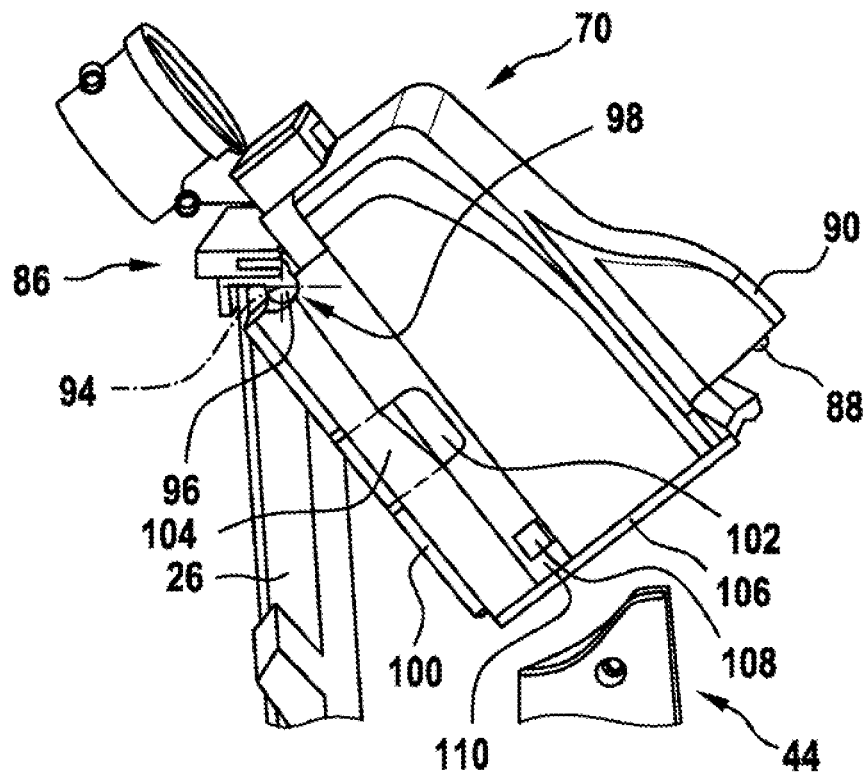
Figure 4D:
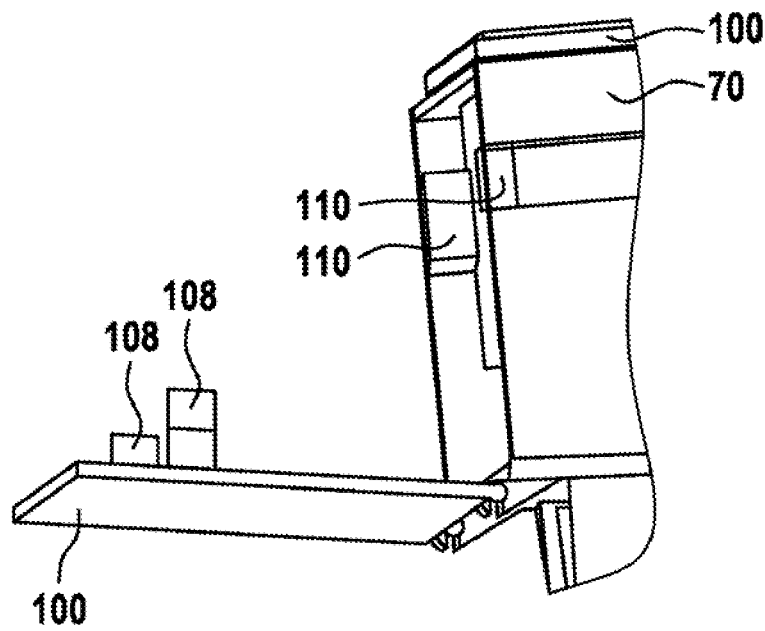
Figure 5:
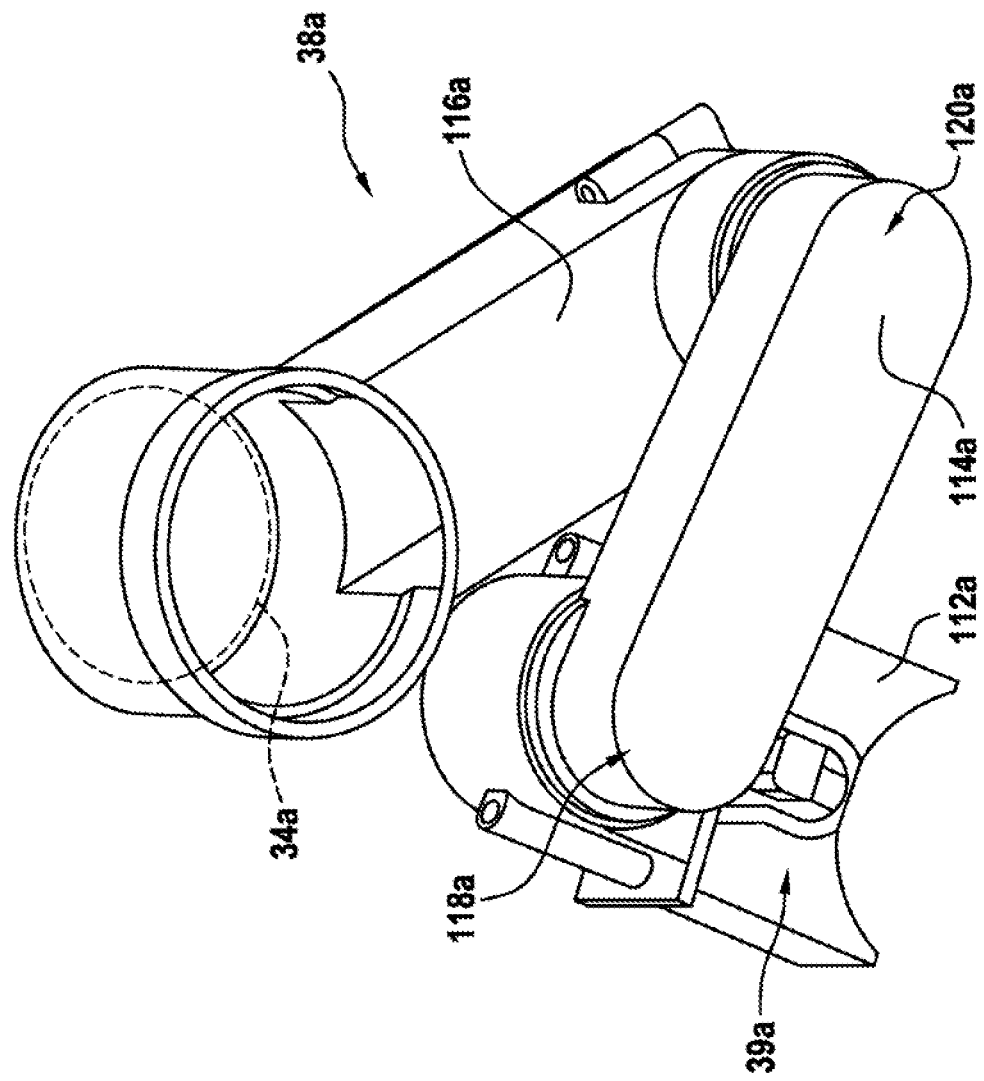
Figure 6:
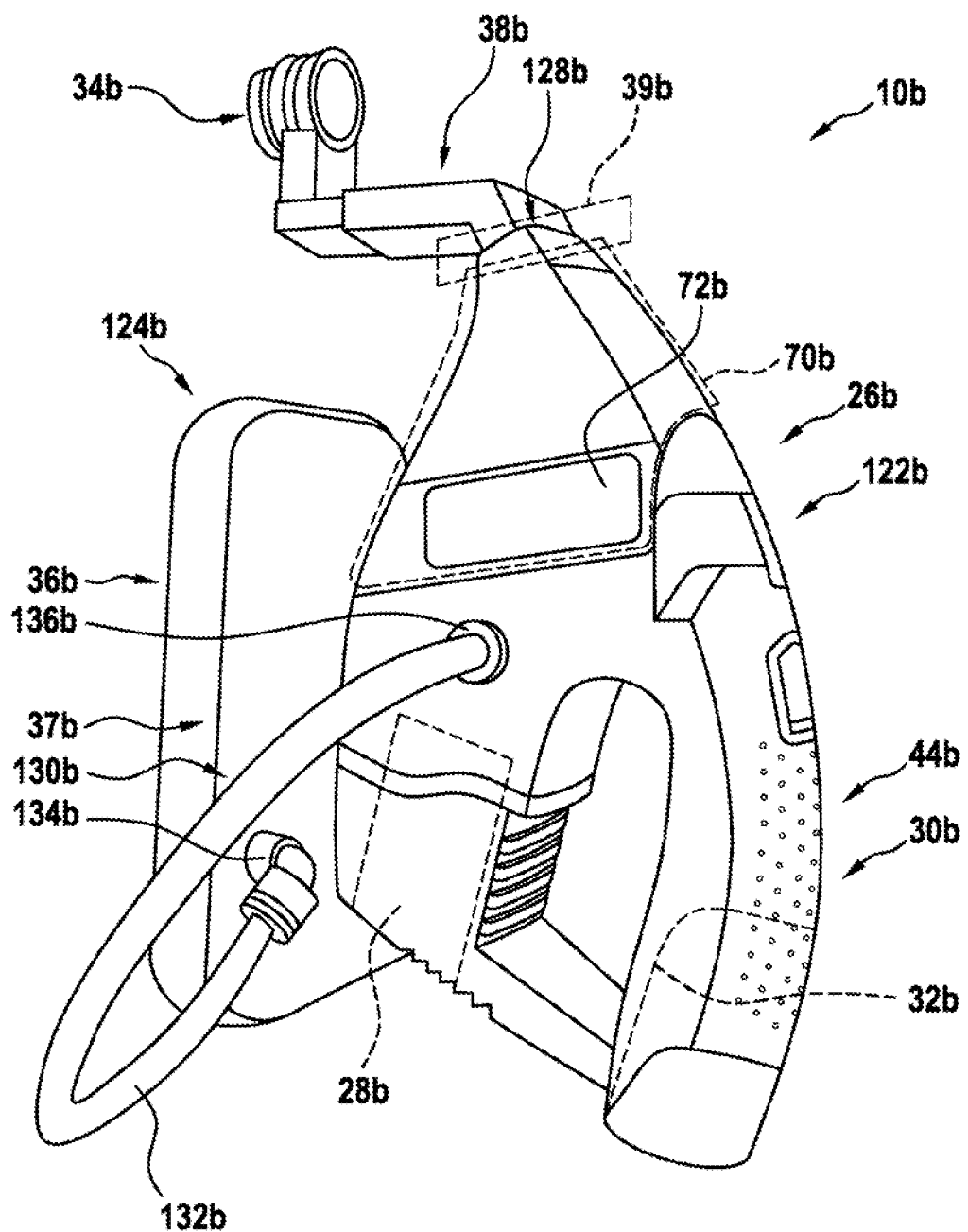
Figure 7:
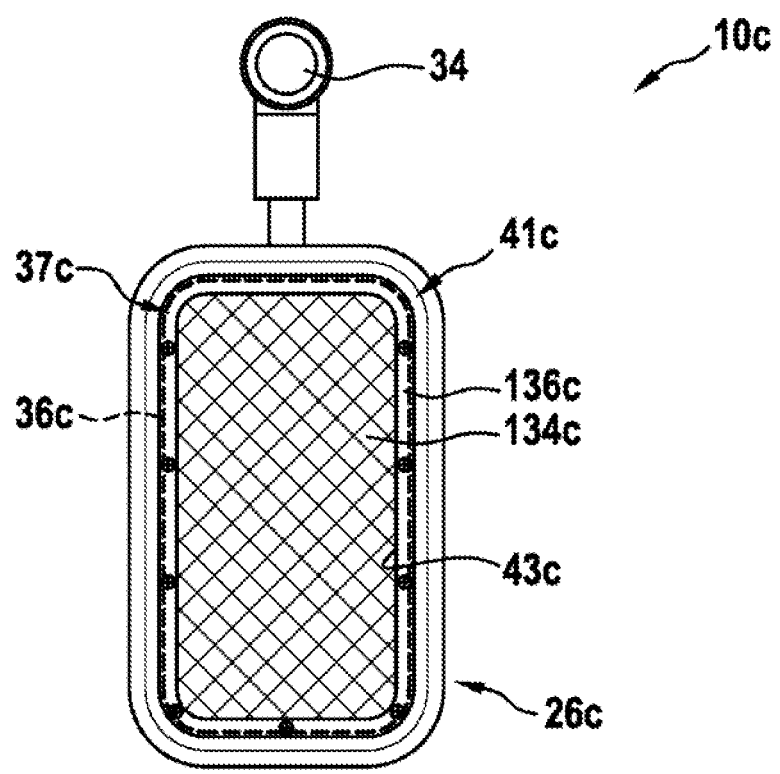

There are shown:

FIG. 1 side view of a system composed of a dust extraction device according to the disclosure and a hand-held power tool;

FIG. 2 longitudinal section of the dust extraction device according to FIG. 1;

FIG. 3a rear view of the dust extraction device according to FIG. 1;

FIG. 3b front view of the dust extraction device according to FIG. 1;

FIG. 4a a perspective partial view of a dust collection chamber of the dust extraction device;

FIG. 4b a section through a locking unit of the dust collection chamber;

FIG. 4c a perspective partial view of the dust collection chamber in the unlocked state;

FIG. 4d a perspective partial view of the dust collection chamber in the open state;

FIG. 5 a perspective view of an alternative embodiment of a dust nozzle;

FIG. 6 a perspective view of an alternative embodiment of the dust extraction device;

FIG. 7 a perspective view of an alternative embodiment of the dust extraction device;

DESCRIPTION OF THE EXEMPLARY EMBODIMENTS

FIG. 1 shows a dust extraction device 10 in a longitudinal section, and a hand-held power tool 12 in a side view. The hand-held power tool 12 is realized, for example, as a hammer drill 14. The hand-held power tool 12 has a percussion mechanism, and has a drive unit 16 that comprises an electric motor. The percussion mechanism may be realized, for example, as a pneumatic percussion mechanism. The drive unit 16 is coupled to a tool receiver 18, in which an insert tool 20, realized as a rock drill bit, is separably received, or fastened. The hand-held power tool 12 has a battery interface 22, via which a battery pack 23, realized as a hand-held power tool battery pack, is separably connected.

The dust extraction device 10 has been attached to a workpiece 24. The dust extraction device 10 has a housing 26, arranged in which there is a fan unit 28 for generating an air volume flow 29. The dust extraction device 10 has a battery interface 30, via which a battery pack 32 that is realized, for example, as a hand-held power tool battery pack, is separably connected to the dust extraction device 10. The energy supply to the dust extraction device 10 is provided via the battery pack 32. In particular, the battery pack 32 is electrically connected to the fan unit 28 for the purpose of supplying energy. Preferably, the battery interface 30 of the dust extraction device 10 is substantially identical in design to the battery interface 22 of the hand-held power tool 12, such that the battery pack 23 of the hand-held power tool 12 can also be connected to the dust extraction device 10.

Furthermore, the dust extraction device has a extraction opening 34 for extracting drilling debris by suction from the drill hole, and an aspiration opening 36 for generating a negative pressure in an adhesion region 37 between the dust extraction device 10 and the workpiece 24. The aspiration opening 36 advantageously bears fully against the workpiece 24, so that as great a negative pressure as possible can be generated between the dust extraction device 10 and the workpiece 24. The extraction opening 34 is assigned to a dust nozzle 38. The extraction opening 34 bears, for example, fully against the workpiece 24. It is also conceivable, however, for the extraction opening 34 to bear only partially against the workpiece 24, or to be spaced apart from the workpiece 24 via a gap. The dust nozzle 38 has a substantially cylindrical receiver 40, by which the insert tool 20 can be guided through the dust nozzle 38. The extraction opening 34 forms the front end of the receiver 40 of the dust nozzle 38. The rear end of the receiver 40 of the dust nozzle 38 may advantageously have a flexible seal 42, which prevents drilling debris, or dust, from coming out of the rear end of the receiver 40 (see FIG. 3). The flexible seal 42 may consist, for example, of elastic bristles, for example plastic bristles.

Furthermore, the dust extraction device 10 has a handle 44. The handle 44 extends substantially parallel to a surface 25 of the workpiece 24. The handle 44 is realized as a single piece with the housing 26 of the dust extraction device 10. On the handle 44, the dust extraction device 10 has an operating switch 46, by means of which the dust extraction device 10 can be switch on and off. The operating switch 46 is arranged, for example, on a side of the dust extraction device 10 that faces away from the aspiration opening 36. Alternatively, however, other arrangements of the operating switch 46 are also conceivable, such as, for example, at the side of the handle 44, or on a side of the handle 44 that faces toward the aspiration opening 36.

FIG. 2 shows a longitudinal section of the dust extraction device 10. The dust extraction device 10 is shown, in particular, in proper operation. When in operation, the dust extraction device 10 is in the switched-on state, with the fan unit 28 being supplied with electrical energy by the connected battery pack 32. When in operation, the dust extraction device 10 is fully attached to the workpiece 24 by the negative pressure in the adhesion region 37. In other words, the dust extraction device 10, when in operation, is held by itself on the workpiece 24.

The battery pack 32 has a housing 48, in which, for example, five battery cells 50 are accommodated in a row. The battery pack 32 is thus realized as a single-layer battery pack. It is also conceivable for the battery pack 32 to be of a two-layer or three-layer design. The battery pack 32 has, for example, an operating voltage of 18 V. The battery interface 30 of the dust extraction device 10 has guide elements, not represented in greater detail, which can be connected to corresponding guide elements of the battery pack 32 that are not represented in greater detail. The respective guide elements comprise, for example, guide rails and guide grooves. Furthermore, the battery interface 30 of the dust extraction device 10 and the battery pack 32 comprises corresponding locking elements 52, 54, by means of which the battery pack 32 can be locked to the housing 26 of the dust extraction device. The locking element 52 of the dust extraction device 10 is realized as a cutout in which the locking element 54 of the battery pack 32, realized as a rotatably mounted latching element, engages when in the locked state. The locking element 54 of the battery pack 56 is mechanically coupled to an actuating element 56 arranged, for example, on the battery pack 32. The locking can be released by a manual actuation of the actuating element 56.

The fan unit 28 has an electric motor 58 and a ventilating fan element 60 that is realized, for example, as a radial ventilator. The ventilating fan element 60 is connected in a rotationally fixed manner to a motor shaft 62 of the electric motor 58 in order to transmit a rotational drive motion of the electric motor 58 to the ventilating fan element 60. The electric motor 58 is accommodated in the housing 26 of the dust extraction device 10 in such a manner that, when in the attached state, a rotation axis 64 of the electric motor 58 intersects the surface 25 of the workpiece 24, in particular substantially perpendicularly. In order to generate a sufficiently large air volume flow, the ventilating fan element 60 has a diameter 66 that is greater than a diameter 68 of the electric motor 58. In particular, the diameter 66 of the ventilating fan element 60 corresponds to at least 150% of the diameter 68 of the electric motor 58, preferably at least 200% of the diameter 68 of the electric motor 58. The ventilating fan element 60 is arranged on the end of the electric motor 58 that faces toward the workpiece 24.

The rotationally driven ventilating fan element 60 generates an air flow. When the dust extraction device 10 is in operation, the air flow 29 enters the housing 26 of the dust extraction device 10 in the region of the dust nozzle 38. With the air flow 29, the drilling debris, or dust, that is produced while work is being performed on the workpiece 24 by the hand-held power tool 12 enters the housing 26 of the dust extraction device 10 in the region of the extraction opening 34. The drilling debris, or the air flow 29, is guided in the dust nozzle 38 to a dust collection chamber 70. The dust collection chamber 70 is delimited by a filter element 72, such that, advantageously, the drilling debris accumulates in the dust collection chamber 70. The filter element 72 is realized, for example, as a HEPA folded filter.

The air flow 29 passes out of the dust collection chamber via the filter element 72, and into the adhesion region 37. Thus, advantageously, a substantially dust-free air flow 29 goes into the adhesion region 37. On the side that faces toward the workpiece 24, the adhesion region 37 is delimited by the aspiration opening 36. The aspiration opening 36 is realized as an opening in the housing 26 of the dust extraction device 10. Preferably, in the region of the aspiration opening 36 the dust extraction device 10 has a sealing means 74, the dust extraction device 10 bearing against the workpiece 24, in the region of the aspiration opening 36, via the sealing means 74. The sealing means 74 is made, in particular, of a flexible and/or elastic plastic material. For example, in this exemplary embodiment the sealing means 74 is realized as a circumferential sealing lip. Advantageously, owing to the sealing means 74 realized as a sealing lip, the negative pressure in the adhesion region 37 can be increased, such that the aspiration force of the dust extraction device 10 against the workpiece 24, generated by the negative pressure, is increased. The air flow 29 moves in the adhesion region 37 in the direction of the ventilating fan element 60 and emerges from it, in the region of the ventilating fan element 60, via air outlet openings in the housing 26 of the dust extraction device 10, which are not represented.

At its upper end, the dust extraction device 10 has the dust nozzle 38, and at its lower end has the battery interface 30 with the battery pack 32. The dust collection chamber 70 is arranged above the fan unit 28, between the dust nozzle 38 and the battery interface 30. Thus, advantageously, a very compact design can be achieved. The dust collection chamber 70 and the fan unit 28 are thus preferably located substantially in a region that is spanned by the aspiration opening 36. A region spanned by the aspiration opening 36 is to be understood to mean, in particular, a rectangular space that is spanned circumferentially, or in two dimensions, by the aspiration opening 36.

It is also conceivable that, in an alternative embodiment, the battery pack 32 is accommodated in the housing 26, in particular in the handle 44, in such a manner that both the dust collection chamber 70, the fan unit 28 and the battery pack 32 are substantially arranged in the region spanned by the aspiration opening 36. The connection direction 76 along which connection of the battery pack 32 to the dust extraction device 10 is effected is, for example, parallel to the rotation axis 64 of the electric motor 58. However, other connection directions are also conceivable, for example a connection direction that is substantially parallel to a longitudinal extent of the handle 44.

FIG. 3*a* shows a rear view of the dust extraction device 10 when attached to the workpiece 24. A dashed line indicates both the surface area spanned by the extraction opening 34 and the surface area spanned by the aspiration opening 36. The surface area spanned by the extraction opening 34 is of a size that is less than 5% of the size of the surface area spanned by the aspiration opening 36. Thus, advantageously, a sufficiently high aspiration force of the dust extraction device 10 can be ensured, so that the dust extraction device 10 can be held fully against the workpiece 24. Furthermore, a length 80 of the aspiration opening 36 corresponds to at least 75% of a length 82 of the dust extraction device 10, excluding the battery pack 32.

FIG. 3*b* shows a front view of the dust extraction device 10. The adhesion region 37 is delimited, on the side that faces toward the workpiece 24, by the aspiration opening 36, and on the opposite side is delimited by the housing 26, in particular a wall 27. The wall 27 extends substantially parallel to the aspiration opening 36. When attached to a workpiece 24, the wall 27 is substantially parallel to the workpiece 24.

The wall 27 has two recesses 31, 33. The recesses 31, 33 are realized, in particular, as air passages, through which the air flow 29 is routed during operation. The first recess 31 is designed for fluidic connection of the dust collection chamber 70 to the adhesion region 37. The first recess 31 is, for example, of a rectangular shape. The first recess 31 is arranged adjacent to the dust collection chamber 70. In particular, the wall 27 has a side that faces toward the adhesion region 37, and a side that faces toward the dust collection chamber 70, the filter element 72 of the dust collection chamber 70 being arranged on, preferably bearing against, the side that faces toward the dust collection chamber 70. In particular, the filter element 72 bears against the wall in such a manner that the air flow 29 can only pass through the first recess 31 via the filter element 72.

The second recess 33 is arranged adjacent to the fan unit 28. The second recess 33 is designed for fluidic connection of the adhesion region 37 to the fan unit 28. The second recess 33 has a circular cross section. In the region of the second recess 33 the dust extraction device 10 has a protective unit 41. The protective unit 41 is designed, in particular, to protect the fan unit 28. The protective unit 41 has a filter element 43. The filter element 43 is realized, for example, as a metal mesh. In particular, the filter element 43 is arranged in the region of the second recess 33 in such a manner that an air flow, when passing through the second recess, must also pass through it. The filter element 43 is arranged, in particular, in the second recess 33. The filter element 43 of the protective unit 41 has a larger pore size than the filter element 72 of the dust collection chamber 70. The cross-sectional area of the second recess 33 is smaller than the cross-sectional area of the first recess 31. In particular, the cross-sectional area of the second recess 33 is less than 20% of the cross-sectional area of the first recess 31.

FIG. 4*a* shows a perspective partial view of the dust collection chamber 70 when connected to the housing 26 of the dust extraction device 10. The dust nozzle 38 has a mechanical interface 39 via which the dust nozzle 38 is separably connected to the dust collection chamber 70 by means of a latching connection.

The dust collection chamber 70, in turn, is separably connected to the housing 26 of the dust extraction device 10. In particular, the dust collection chamber 70 is connected to the housing 26 of the dust extraction device via a locking unit 84 and a swivel unit 86. The locking unit 84 comprises a movably mounted locking element 88 and an actuating element 90 that are arranged, for example, on the dust collection chamber 70. There is a corresponding locking element 92 arranged on the housing 26, in particular on the handle 44, of the dust extraction device 10. The two locking elements 88, 92 are designed for separable force-fitting and/or form-fitting connection between the dust collection chamber 70 and the handle 44. The actuating element 90 and the locking element 88 are coupled to each other in such a manner that the two locking elements 88, 92 can be brought out of engagement by a manual actuation of the actuating element 90. The locking element 88 of the dust collection chamber 70 is realized, for example, as a lug, or as a hook, and the locking element 92 of the handle 44 is realized, for example, as a recess. The actuating element 90 may be preloaded with a force, in the direction of the locking position, by means of a spring element, for example an annular spring (not represented). FIG. 4*b* shows a section through the locking unit 84, the locking being able to be released by a manual actuation of the actuating element 90, along the actuation direction 91.

After the locking of the locking unit 84 has been released, the dust collection chamber 70 can be released from the housing 26 of the dust extraction device 10 by means of a swivel movement about a swivel axis 94 of the swivel unit 86 (see FIG. 4*c*). The swivel unit 86 consists, for example, of a cylindrical form-fit element of the housing 26, arranged on which, when in the connected state, there is a corresponding form-fit element 98, realized as a semicircular groove, on the outer surface of the dust collection chamber 70.

The filter element 72 may be inseparably connected to the dust collection chamber 70, or alternatively, as shown by way of example, may be separably connected to the dust collection chamber 70. The filter element 72 has a plastic frame 100 that is made, for example, of a hard plastic. Formed integrally on the plastic frame 100 are two opposing latching arms 102, which can be separably connected to receiving pockets 104 of the dust collection chamber 70. Advantageously, following removal of the filter element 72 the dust collection chamber 70 can be emptied, and the filter element 72 cleaned.

To enable the dust collection chamber 70 to be emptied even when there is a filter element 72 inserted, the dust collection chamber 70 additionally has an emptying flap 106. The emptying flap 106 is arranged on the side of the dust collection chamber 70 that faces away from the dust nozzle 38. The emptying flap 106 is mounted, for example, in a swivelable manner in the housing of the dust collection chamber 70. The emptying flap 106 has two latching arms 108 that, in the closed state, engage in corresponding receiving pockets 110 of the dust collection chamber 70. FIG. 4*d* shows the emptying flap 106 in the open state, the emptying flap 106 in the open state furthermore being partially, in particular rotatably, connected to the dust collection chamber 70.

As an alternative or in addition to the emptying flap 106, it would also be conceivable for the housing of the dust extraction device 10, in particular the dust collection chamber 70, to have a coupling point for an external vacuum cleaner (not represented). The coupling point may be arranged, for example, on the opposite side of the dust collection chamber 70 to the filter element 72, but other arrangements are also conceivable. The coupling point may preferably be designed for coupling to a suction hose of the external vacuum cleaner. The coupling point is preferably of a closable design, such that, when in the closed state, no dust can come out of the dust collection chamber 70. Advantageously, the dust collection chamber 70 may be emptied via the coupling point, without the contents of the dust collection chamber 70 coming out into the surroundings. Furthermore, if required, the negative pressure in the dust collection chamber 70 may be generated both by the internal fan unit 28 in the housing 26 of the dust extraction device 10 and by an external fan unit of the external vacuum cleaner (not represented).

FIG. 5 shows an alternative embodiment of the dust nozzle 38. The dust nozzle 38a has a mechanical interface 39a, which corresponds substantially to the mechanical interface 39 of the previously described dust nozzle 38. The dust nozzle 38a is thus designed to be exchangeable with the preceding dust nozzle 38. The dust nozzle 38a likewise has an aspiration opening 36a that, when having been connected to the dust extraction device 10, faces toward the workpiece 24. Additionally and optionally, the dust nozzle 38a may likewise have a flexible seal. The dust nozzle 38a has three sub-regions 112a, 114a, 116a, which are designed to be movable relative to each other. The first sub-region 112a comprises the mechanical interface 39a. The third sub-region 116a comprises the extraction opening 34a. The first sub-region 112a is rotatably connected to the second sub-region 114a via a first rotary joint 118a. Furthermore, the second sub-region 114a is connected to the third sub-region 116a via a second rotary joint 120a. Advantageously, by means of the two rotary joints 118a, 120a the position of the extraction opening 34a of the dust nozzle 38a relative to the mechanical interface 39a can be altered, in particular manually, in two spatial directions. The extraction opening 34a can thus be altered in its height and/or in its lateral position with respect to the mechanical interface 39a, with the distance from the workpiece 24 being constant.

FIG. 6 shows an alternative embodiment of the dust extraction device 10b in a perspective view. The dust extraction device 10b has a housing 26b. The housing 26b of the dust extraction device 10b has a first housing part 122b and a second housing part 124b. The two housing parts 122b, 124b are separably connected to each other in a force-fitting and/or form-fitting manner via a mechanical interface 126b that is not represented in greater detail. The first housing part 122b comprises a dust collection chamber 70b, and a fan unit 28b for generating an air flow. Furthermore, the first housing part 122b comprises a battery interface 30b, via which a battery pack 32b can be separably connected to the dust extraction device 10b, in particular to the first housing part 122b. The battery pack 32b is realized as a hand-held power tool battery pack. The first housing part 122b has a handle 44b, in which the battery pack 32b is mainly accommodated. Mainly, in the context of this application, is to be understood to mean, in particular, at least 50%. Preferably, in the connected state, only a cap piece of the battery pack 32b projects out from the first housing part 122b. The dust collection chamber 70b has an inlet 128b via which the air flow enters the dust collection chamber 70b. Arranged in the dust collection chamber 70 is a filter element 72b which, as already described above, is realized as a HEPA filter. The inlet 128b of the dust collection chamber 70b is realized as a mechanical interface 39b, via which an extraction attachment such as, for example, a hose or a tube (not represented), or a dust nozzle 38b having an extraction opening 34b, can be separably connected to the dust extraction device 10b. In this embodiment, the mechanical interface 39b is realized, by way of example, for force-fitting connection. For example, the inlet 128b of the dust collection chamber 70b is at least partially conical.

The second housing part 124b has an adhesion region 37b. The adhesion region 37b in this case is spanned by the second housing part 124b itself and by the aspiration opening 36b. As already in the previously described embodiment, there is a circumferential sealing means 74b arranged in the region of the aspiration opening 36b, in order to optimize the negative pressure in the adhesion region 37b. When connected to the first housing part 122b, the dust extraction device 10b is also interconnected via an air exchange interface 130, in addition to the mechanical interface 126b. The air exchange interface 130b is realized, for example, as a hose 132b, which is connected to a respective opening 134b, 136b in the first housing part 122b and in the second housing part 124b. The air exchange interface 130b is designed to fluidically connect the first housing part 122b and the second housing part 124b in such a manner that a negative pressure in the adhesion region 37b can be generated within the second housing part 122b by means of the fan unit 28, which is arranged in the first housing part 122b. Various designs of the air exchange interface 130b are conceivable.

When the first housing part 122b has been separated from the second housing part 124b, the first housing part 122b may be used on its own, as a hand-held vacuum cleaning device. When the first housing part 122b is connected to the second housing part 124b, the first housing part 122b, or the dust extraction device 10b, may be used as a self-held dust extraction device 10b.

FIG. 7 shows a dust extraction device 10c having an alternative embodiment of the protective unit 41, in a front view. The dust extraction device 10c corresponds substantially to the previously described dust extraction device 10, and differs only in the design of the protective unit 41c. The protective unit 41c has a filter element 43c, which is realized in a force-fitting and/or form-fitting manner with the housing 26c of the dust extraction device 10c. In particular, the filter element 43c is connected to the housing 26c of the dust extraction device 10c via a screwed connection. The filter element 43c is in particular realized in such a manner that it substantially completely covers the aspiration opening 36c. The filter element 43c has a filter region 134c that is made of plastic, in particular, a foam material. Furthermore, the filter element 43c has a frame 136c that surrounds the filter region 134c. The frame 136c is connected, in particular, to the filter region 134c. For example, the filter element 43c is connected to the housing 26c of the dust extraction device 10c via the frame 136c.

The invention claimed is:

1. A dust extraction device for a hand-held power tool, comprising:
   a housing;
   a fan unit accommodated in the housing and configured to generate an air volume flow;
   at least one extraction opening configured to extract drilling debris by suction from a drill hole in a workpiece; and
   at least one aspiration opening configured to generate a negative pressure in an adhesion region between the dust extraction device and the workpiece using the air volume flow,
wherein
   the dust extraction device is configured to be electrically connected to a battery cell, the dust extraction device has a battery interface, the battery interface is designed to connect the dust extraction device to a hand-held power tool battery pack, the extraction opening is connected to the adhesion region such that there is a negative pressure present both in the region of the extraction opening and in the adhesion region while the drilling debris is being extracted from the drill hole by the suction, and the negative pressure in the region of the extraction opening differs from the negative pressure in the adhesion region.

2. The dust extraction device as claimed in claim 1, wherein the dust extraction device has a dust collection chamber that has a filter element.

3. The dust extraction device as claimed in claim 2, wherein a negative pressure in the dust collection chamber is less than the negative pressure in the adhesion region.

4. The dust extraction device as claimed in claim 2, wherein, in the direction of flow of the generated air volume flow, the filter element is arranged in front of the adhesion region.

5. The dust extraction device as claimed in claim 4, wherein:

the dust extraction device has a protective unit configured to protect the fan unit; and the protective unit is arranged, in the direction of flow of the generated air volume flow, between the adhesion region and the fan unit.

6. The dust extraction device as claimed in claim 2, wherein the dust collection chamber is connected, at least partially separably, to the dust extraction device.

7. The dust extraction device as claimed in claim 1, wherein the dust extraction device has a control unit that controls the dust extraction device by closed-loop or open-loop control in dependence on a charge state of a battery.

8. The dust extraction device as claimed in claim 1, wherein:

the housing has a handle that extends substantially parallel to the at least one aspiration opening; and the battery interface is arranged on the handle.

9. The dust extraction device as claimed in claim 1, wherein:

the housing has at least two separably connected housing parts;

the first housing part has at least the dust collection chamber; and the fan unit and the second housing part comprises at least the adhesion region.

10. The dust extraction device as claimed in claim 9, wherein the dust extraction device with the second housing part removed is configured as a hand-held vacuum cleaner.

* * * * *